(12) United States Patent
Hoffstadt et al.

(10) Patent No.: US 11,473,702 B1
(45) Date of Patent: Oct. 18, 2022

(54) INTEGRAL EXPANDED UPSET

(71) Applicant: BENOIT PREMIUM THREADING, LLC, Houma, LA (US)

(72) Inventors: Jonathan Hoffstadt, Kingwood, TX (US); Preston Cothren, Ponchatoula, LA (US); Danny Boquet, Houma, LA (US)

(73) Assignee: BENOIT PREMIUM THREADING, LLC, Houma, LA (US)

( * ) Notice: Subject to any disclaimer, the term of this patent is extended or adjusted under 35 U.S.C. 154(b) by 109 days.

(21) Appl. No.: 16/845,152

(22) Filed: Apr. 10, 2020

Related U.S. Application Data

(60) Provisional application No. 62/831,958, filed on Apr. 10, 2019.

(51) Int. Cl.
| | |
|---|---|
| *F16L 15/00* | (2006.01) |
| *E21B 17/042* | (2006.01) |
| *F16L 58/18* | (2006.01) |
| *F16L 15/08* | (2006.01) |

(52) U.S. Cl.
CPC .......... *F16L 15/001* (2013.01); *E21B 17/042* (2013.01); *F16L 15/08* (2013.01); *F16L 58/182* (2013.01)

(58) Field of Classification Search
CPC ....... E21B 17/042; F16L 15/08; F16L 15/001; F16L 15/04; F16L 15/06; F16L 58/182
See application file for complete search history.

(56) References Cited

U.S. PATENT DOCUMENTS

| | | | | |
|---|---|---|---|---|
| 3,100,656 A | * | 8/1963 | Macarthur | F16L 15/04 285/55 |
| 3,336,054 A | * | 8/1967 | Blount | E21B 17/042 285/55 |
| 3,811,710 A | * | 5/1974 | Dula | F16L 15/001 285/55 |
| 4,002,359 A | * | 1/1977 | Lari | E21B 17/042 285/331 |
| 4,549,754 A | * | 10/1985 | Saunders | E21B 17/042 285/334 |
| 4,671,544 A | * | 6/1987 | Ortloff | E21B 17/0423 285/332.2 |
| 4,944,538 A | * | 7/1990 | Read | E21B 17/042 285/334 |
| 6,485,063 B1 | * | 11/2002 | Olivier | E21B 17/042 285/333 |
| 6,670,880 B1 | * | 12/2003 | Hall | F16L 15/001 336/132 |
| 7,331,614 B2 | * | 2/2008 | Noel | F16L 15/06 285/334 |
| 7,581,766 B2 | * | 9/2009 | Verger | E21B 17/042 285/382.2 |

(Continued)

*Primary Examiner* — David Bochna
(74) *Attorney, Agent, or Firm* — Garvey, Smith & Nehrbass, Patent Attorneys, L.L.C.; Vanessa M. D'Souza; Charles C. Garvey, Jr.

(57) ABSTRACT

An improved upset connection for use in the oilfield having an external upset integral connection improving on the existing standard connections, wherein a standard upset connection is expanded creating internal and external shoulders at both the male and female connections, and wherein the external shoulder at the female connection also has an external bevel.

27 Claims, 14 Drawing Sheets

(56) References Cited

U.S. PATENT DOCUMENTS

| | | | | |
|---|---|---|---|---|
| 8,641,100 B2* | 2/2014 | Patureau | ............... | E21B 17/042 |
| | | | | 285/334 |
| 9,366,094 B2* | 6/2016 | Partouche | ............. | E21B 17/042 |
| 9,400,069 B2* | 7/2016 | Angelle | ................ | F16L 15/001 |
| 9,885,214 B2* | 2/2018 | Pacheco | ................ | E21B 17/042 |
| 10,563,466 B2* | 2/2020 | Branly | ................... | F16L 15/06 |
| 10,704,338 B2* | 7/2020 | Enderle | ................ | F16L 15/001 |
| 2005/0189147 A1* | 9/2005 | Williamson | .......... | E21B 17/042 |
| | | | | 175/320 |
| 2011/0203790 A1* | 8/2011 | Carstensen | ............ | E21B 17/042 |
| | | | | 166/242.6 |
| 2011/0233925 A1* | 9/2011 | Pina | ....................... | F16L 15/04 |
| | | | | 285/333 |
| 2014/0333065 A1* | 11/2014 | Pacheco | ............... | F16L 15/001 |
| | | | | 285/334 |
| 2016/0215571 A1* | 7/2016 | Muradov | ............. | E21B 17/042 |

\* cited by examiner

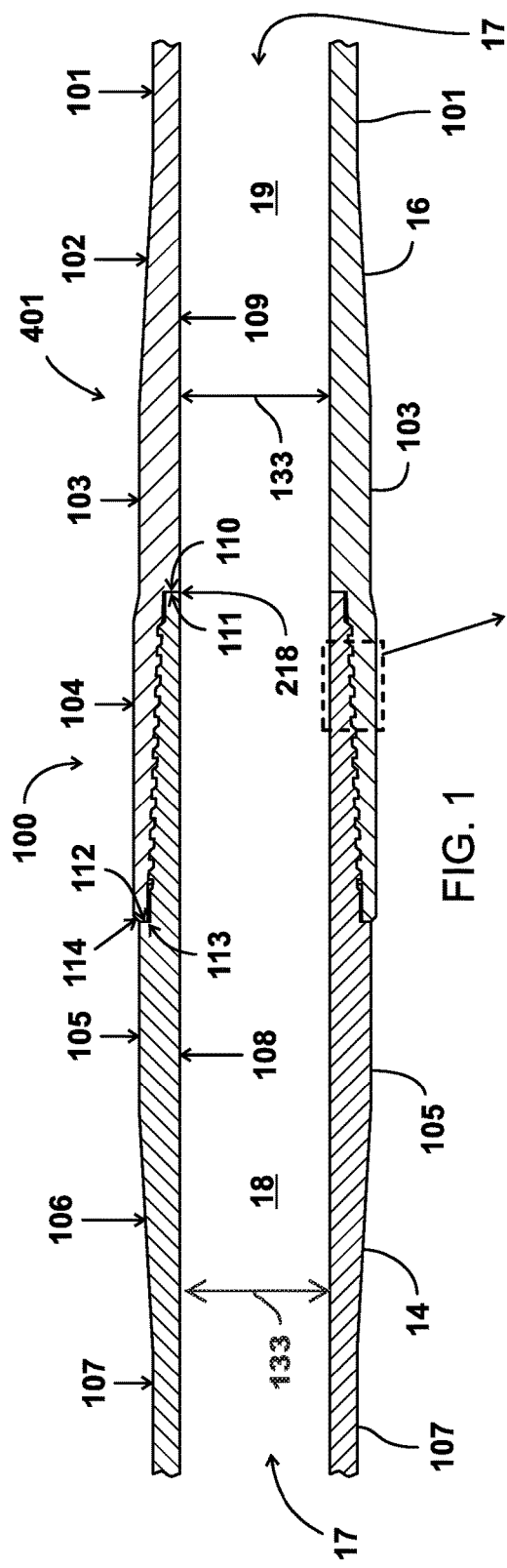
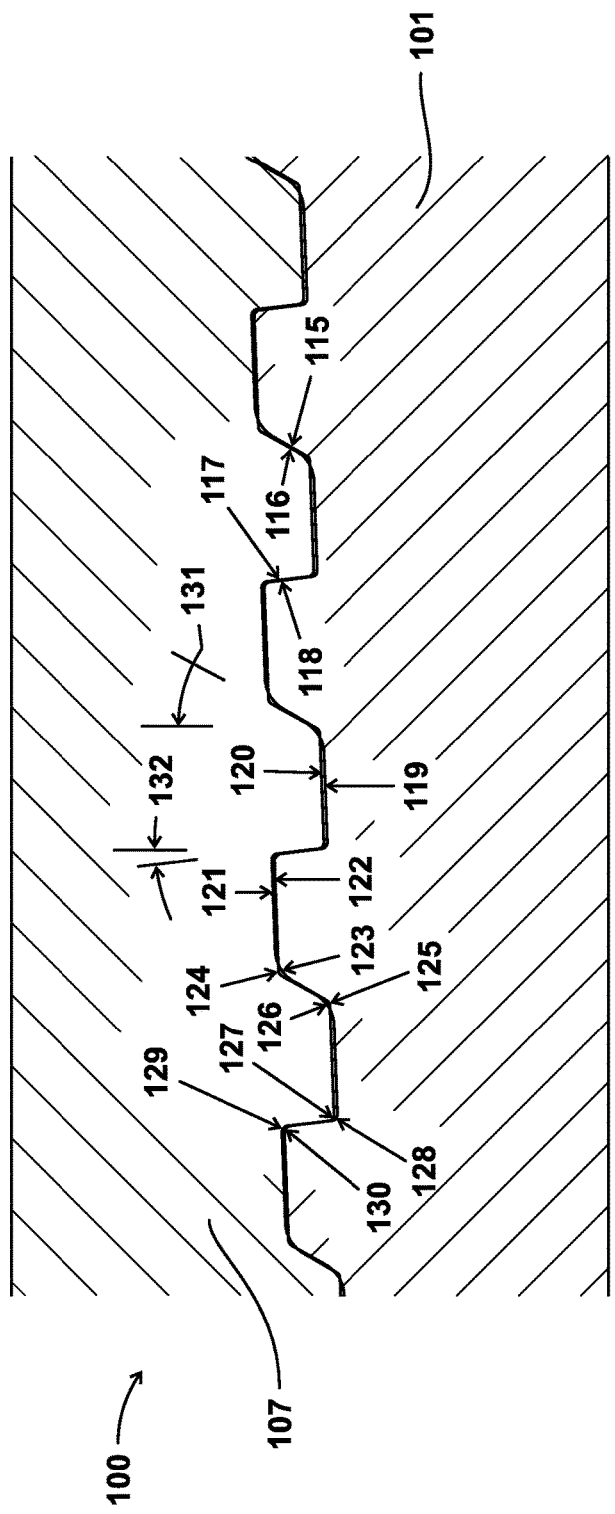
FIG. 1
FIG. 2

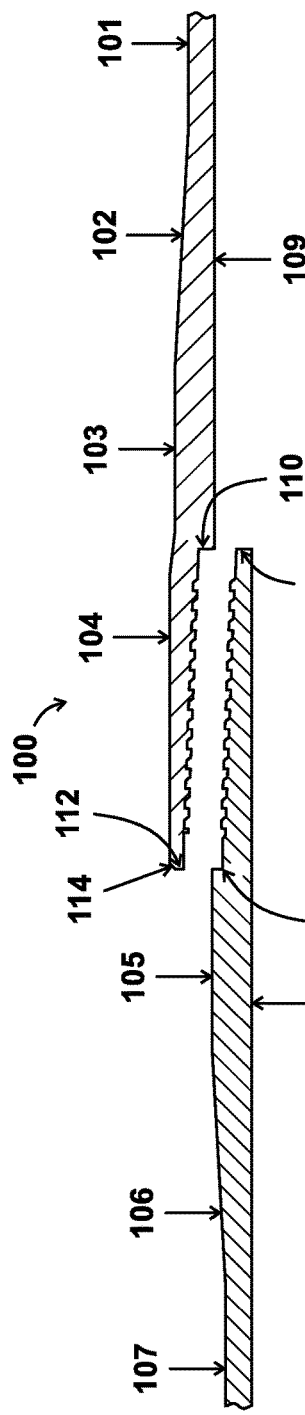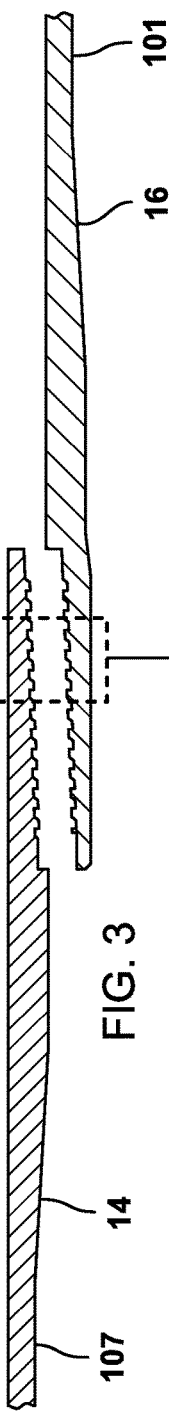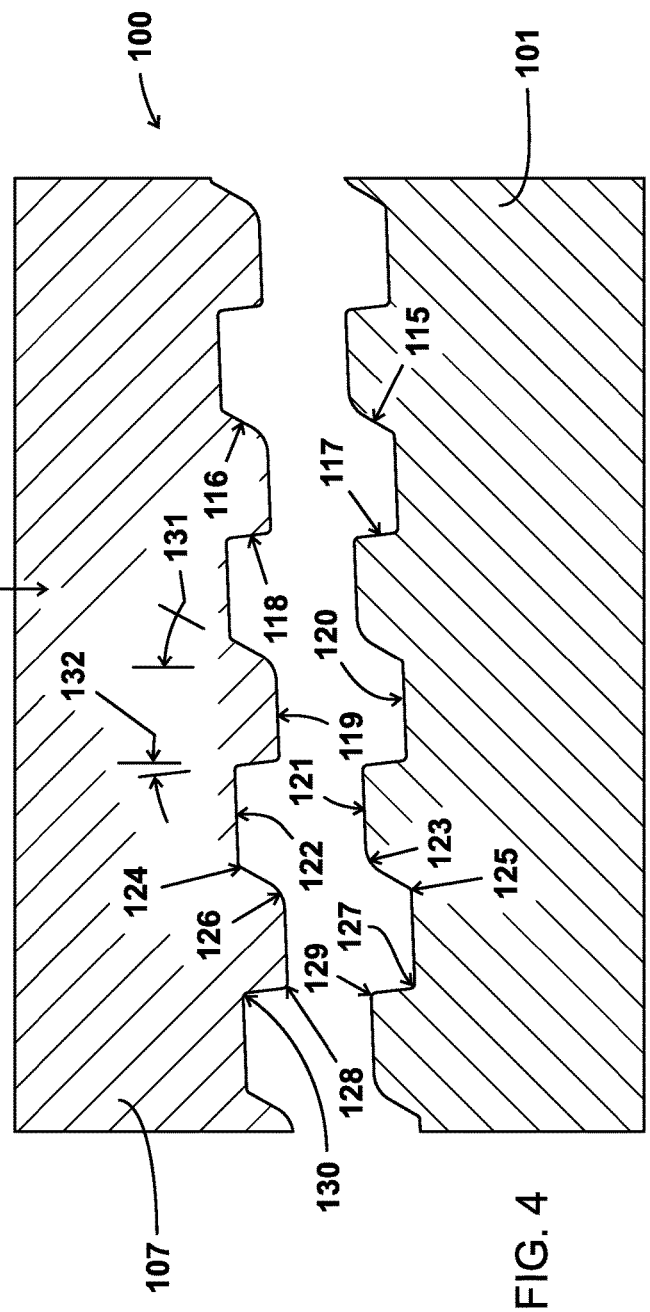
FIG. 3
FIG. 4

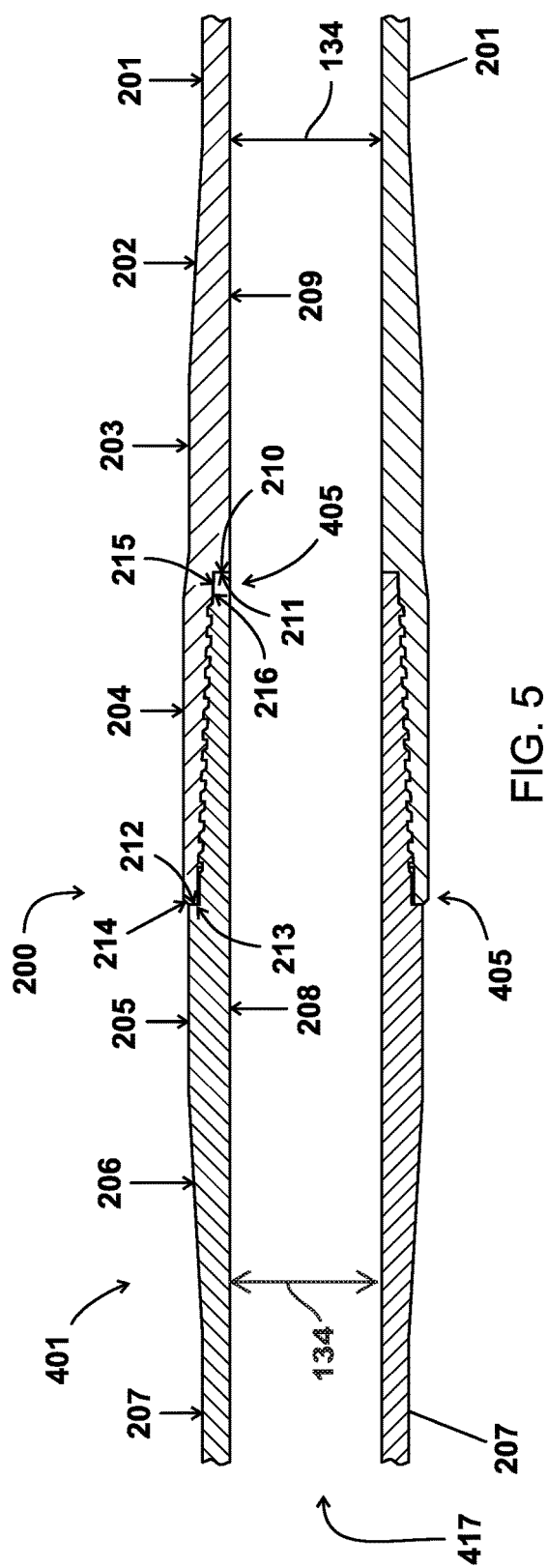
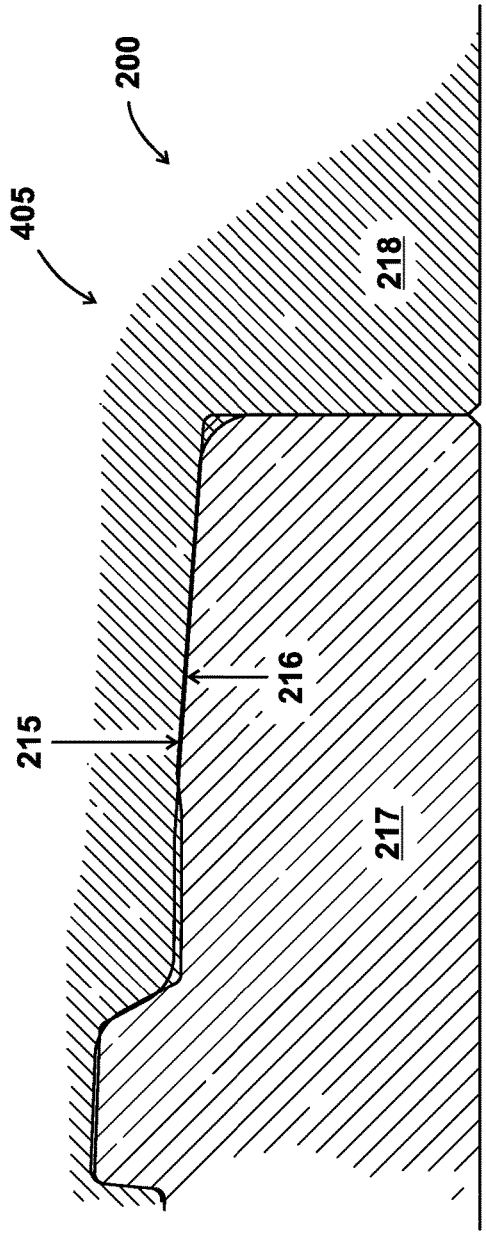
FIG. 5
FIG. 6

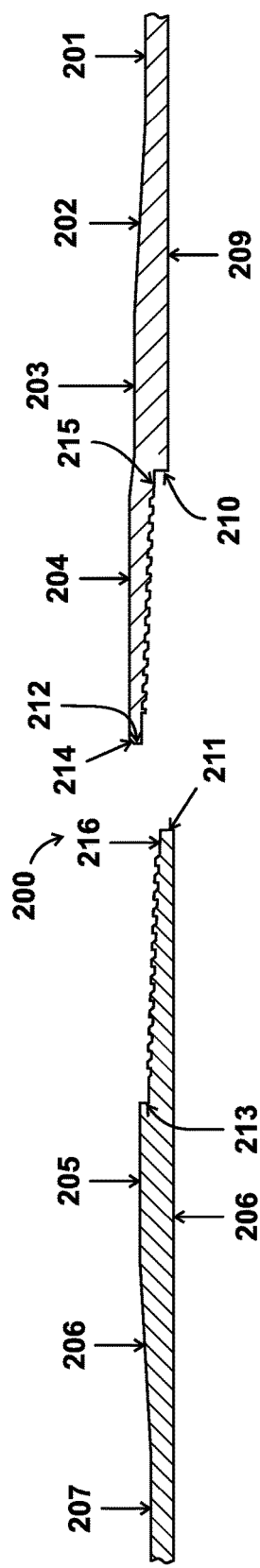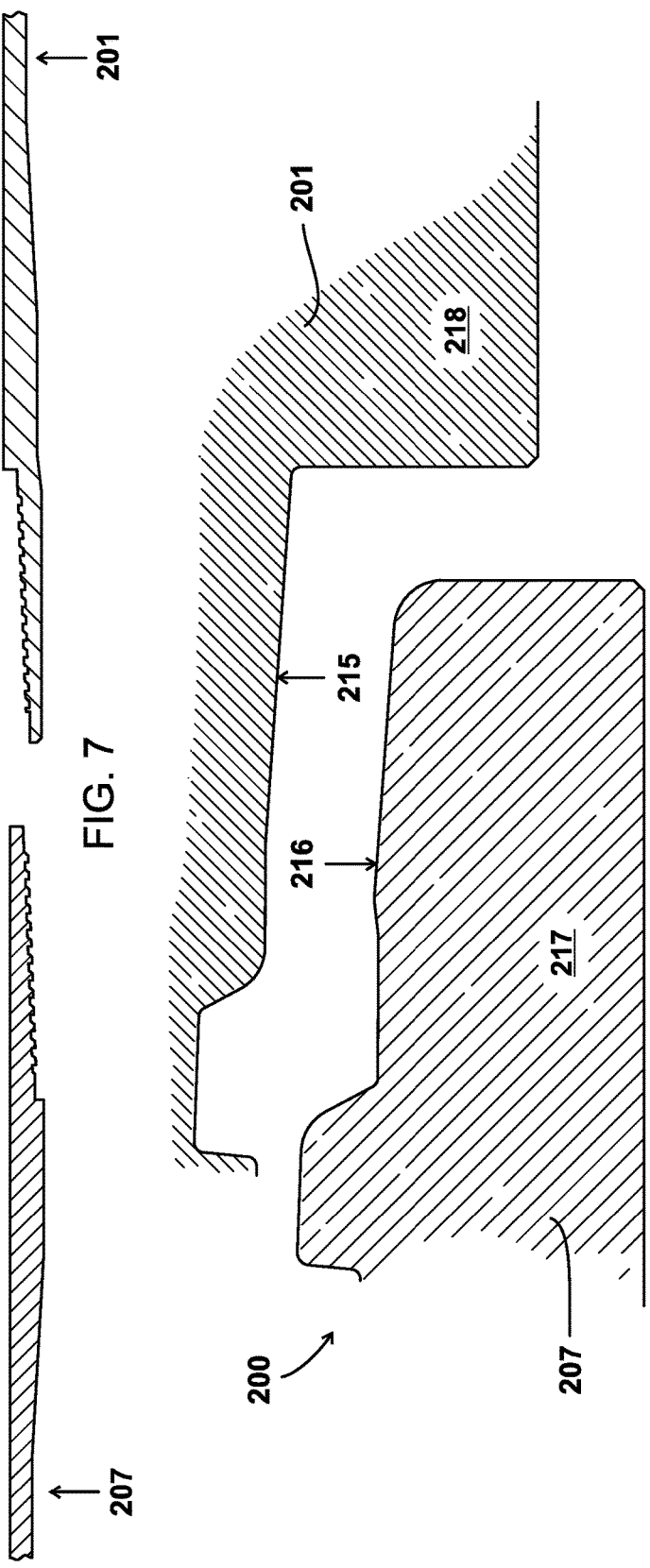
FIG. 7
FIG. 8

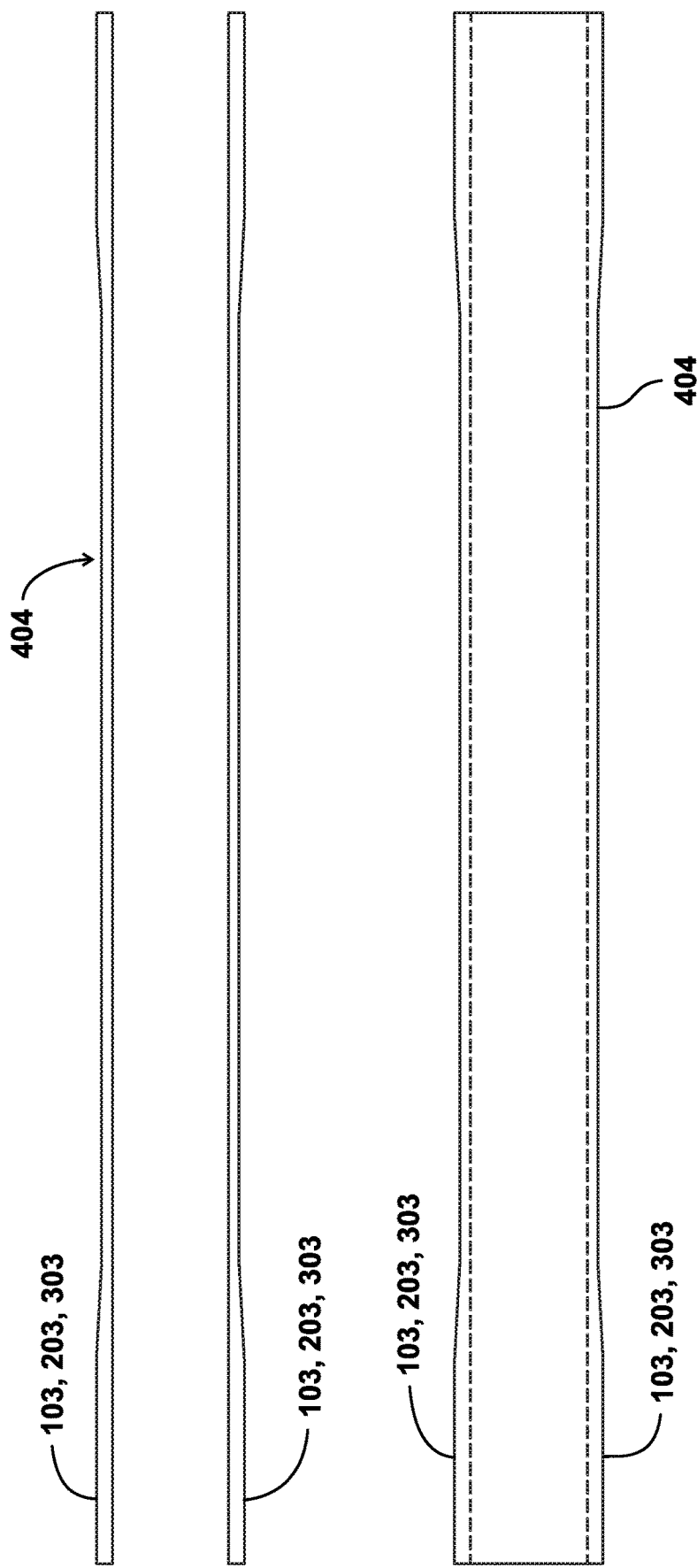

INTEGRAL EXPANDED UPSET

CROSS-REFERENCE TO RELATED APPLICATIONS

The application claims benefit of U.S. Provisional Patent Application No. 62/831,958, filed 10 Apr. 2019, which is hereby incorporated herein by reference and priority to/of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved upset connection for use in the oilfield. More particularly, the present invention relates to an external upset integral connection improving on the existing standard connections.

2. General Background of the Invention

The present invention improves on the current art in oilfield connections providing better performance over the following connections.

API EUE (American Petroleum Institute External Upset End), which is the standard industry API External Upset connection. The present invention improves upon this standard connection.

The API EUE connection requires a coupling. Couplings inherently provide two potential leak paths. Additionally, the API EUE has an open area within the made-up coupling known as the "J" area, which causes turbulent flow through the coupling. This turbulent flow can lead to erosion of the coupling, corrosion, and ultimately connection leaks.

The API EUE has no torque shoulders, which means that torque capacity is limited up to make-up torque of the connection. Additional torque can lead to additional make-up, resulting in galled threads or split couplings.

API NU (American Petroleum Institute Non-Upset) is the standard industry API Non Upset connection. It utilizes a non-upset tubular end.

This connection has lower tensile capacity than the tube, and also requires a coupling. Couplings inherently provide two potential leak paths. It also has the open area within the made-up coupling known as the "J" area, which causes turbulent flow through the coupling. This turbulent flow can lead to erosion of the coupling, corrosion, and ultimately connection leaks.

The API NU connection has no torque shoulders, which means torque capacity is limited up to make-up torque of the connection. Additional torque can lead to additional make-up, resulting in galled threads or split couplings.

The FLUSH JOINT CONNECTION uses threads machined directly on flush end tubes. This connection has limited tensile and torque capacity.

The NEAR FLUSH JOINT uses threads machined on slightly upset ends. This connection has tensile and torque only slightly better than a flush joint connection.

The TWO STEP connection requires larger upsets, which are expensive to manufacture because they require both O.D. (outside diameter) turning and I.D. (inside diameter) boring, in addition to machining the threads.

BRIEF SUMMARY OF THE INVENTION

The apparatus of the present invention is an improved upset connection for use in the oilfield. More particularly, the present invention relates to an external upset integral connection improving on the existing standard connections.

The present invention includes a connection for use in oilfields, comprising a tube body having an industry standard upset (preferably the API EUE forged upset), front and back ends, an outside diameter, and an inside diameter, wherein the front end preferably includes a female connection, and the back end preferably includes a male connection that corresponds to the female connection of the front end. The tube body preferably having an upset transition area at the front end and an upset transition area at the back end. The industry standard upset is preferably expanded creating internal and external shoulders at both the male and female connections, and wherein the female shoulder also preferably has an external bevel. The female connection preferably has a thread stab, thread load, thread crest, and thread root, and wherein the male connection preferably has a thread stab, thread load, thread crest, and thread root. The male and female thread crests and thread roots each preferably have a stab flank having a radius. The male and female thread roots each preferably have a root load flank, each having a radius, and the male and female thread crests each preferably have a crest load flank, each preferably having a radius. The stab flank and load flank are preferably at a specified angle.

In various embodiments, the tube body outside diameter is preferably chosen from the following: 2⅜", 2⅞", 3½", 4", and 4½".

In various embodiments, the tube body inside diameter is preferably chosen from the following: outside diameter is 2⅜" (inside diameter can be one of the following: 1.703", 1.785", 1.867", 1.995", 2.041"); outside diameter is 2⅞" (inside diameter can be one of the following: 1.995", 2.091", 2.195", 2.259", 2.323", 2.441"); outside diameter is 3½" (inside diameter can be one of the following: 2.440", 2.548", 2.640", 2.750", 2.922", 2.992", 3.068"); outside diameter is 4" (inside diameter can be one of the following: 2.780", 3.000", 3.170", 3.340", 3.476", 3.548"); and outside diameter is 4½" (inside diameter can be one of the following: 3.240", 3.380", 3.500", 3.640", 3.740", 3.826", 3.958").

In various embodiments, the male thread root stab flank radius is preferably about 0.0050", the female thread root stab flank radius is preferably about 0.0050", the male thread crest stab flank radius is preferably about 0.0250", and the female thread crest stab flank radius is preferably about 0.0250".

In various embodiments, the male thread root load flank radius is preferably about 0.0050", the female thread root load flank radius is preferably about 0.0050", the male thread crest load flank radius is preferably about 0.0060", and the female thread crest load flank radius is preferably about 0.0060.

In various embodiments, the stab flank angle is preferably about 27.691°.

In various embodiments, the load flank angle is preferably about 6.309°.

In various embodiments, the connection further includes a seal, wherein the seal is preferably found at the male and female connections.

In various embodiments, the connection includes a fiberglass ring groove preferably machined in the female connection, and a corresponding fiberglass ring that preferably sits within the ring groove.

In various embodiments, the connection further includes fiberglass flanges at the male connection and a fiberglass liner.

In various embodiments, the connection includes mortar used at the connection site.

In one or more preferred embodiments, the present invention includes a tubular connection, including a tube body preferably having an industry standard upset, front and back ends, an outside diameter, and an inside diameter, wherein the front end preferably includes a female connection, and the back end preferably includes a male connection that corresponds to the female connection of the front end. The tube body preferably has an upset transition area at the front end and an upset transition area at the back end. The industry standard forged upset is preferably expanded creating internal and external shoulders at both the male and female connections, and wherein the female shoulder also preferably has an external bevel. The female connection preferably has thread stab, thread load, thread crest, and thread root. The male connection preferably has a thread stab, thread load, thread crest, and thread root. The male and female thread crests and thread roots each preferably have a stab flank having a radius. The male and female thread roots each preferably have a root load flank, each having a radius, and the male and female thread crests each preferably have a crest load flank, each having a radius. The stab flank and load flank are preferably at a specified angle.

In various embodiments, the tube body outside diameter is preferably of between about 2⅜ and 4½ inches.

In various embodiments, the tube body inside diameter is preferably between about 1.703 and 3.958 inches.

In various embodiments, the stab flank angle is preferably between about 26 and 29 degrees.

In various embodiments, the load flank angle is preferably between about 5 and 7 degrees.

In one or more preferred embodiments, the present invention includes a thread form for making a tubular connection, including a tube body having a front end, a back end, an outside diameter, and an internal diameter. The front end preferably including an upset transition area, an A.P.I. industry standard upset, and an extension section having a female connection including an internal shoulder, external shoulder and external bevel, wherein the extension section is preferably created by expansion of said industry standard upset. The back end preferably including an upset transition area, an A.P.I. industry standard upset, and a male connection that corresponds with the female connection. The female connection preferably having a thread stab, a thread load, a thread crest, and a thread root. The male connection preferably having a thread stab, a thread load, a thread crest, and a thread root. The male and female thread crests and thread roots each preferably have a stab flank having a radius. The male and female thread roots each preferably have a root load flank, each having a radius, and the male and female thread crests each preferably have a crest load flank, each having a radius. The stab flanks and load flanks are preferably positioned at a specified angle.

In various embodiments, the thread form preferably includes a groove on the female connection, and a correspondingly shaped fiberglass ring that occupies the groove.

In various embodiments, the extension section is preferably made by cold form expansion.

In one or more preferred embodiments, the present invention includes a tubular connection, including a tube body preferably having an external upset connection, front and back ends, an outside diameter, and an inside diameter, wherein the front end preferably includes a female connection, and the back end preferably includes a male connection that is adapted to mate with the female connection of the front end. The tube body preferably having an upset transition area at the front end and an upset transition area at the back end. The external upset connection is preferably expanded creating internal and external shoulders at both the male and female connections, and wherein the external shoulder at the female connection also preferably has an external bevel. The female connection preferably has a thread stab, a thread load, a thread crest, and a thread root. The male connection preferably has a thread stab, thread load, thread crest, and thread root. The male and female thread crests and thread roots each preferably have a stab flank having a radius. The male and female thread roots each preferably have a root load flank, each having a radius, and the male and female thread crests each have a crest load flank, each having a radius. Preferably the stab flank and load flank are at a specified angle.

In one or more preferred embodiments, the present invention includes a thread form for making a tubular connection, including a tube body having a front end, a back end, an outside diameter, and an inside diameter, wherein the front end preferably includes an external upset connection and a female connection, and the back end preferably includes an external upset connection and a male connection that corresponds to the female connection of the front end. The tube body preferably having an upset transition area at the front end and an upset transition area at the back end. The front end external upset connection is preferably expanded creating internal and external shoulders on said female connection, and wherein the female external shoulder also preferably has an external bevel. The female connection preferably has a thread stab, a thread load, a thread crest, and a thread root. The male connection preferably has a thread stab, a thread load, a thread crest, and a thread root. The male and female thread crests and thread roots each preferably have a stab flank having a radius. The male and female thread roots each preferably have a root load flank, each having a radius, and the male and female thread crests each have a crest load flank, each having a radius. The stab flank and load flank are preferably at a specified angle.

In various embodiments, the upset connection is preferably an A.P.I. industry standard upset.

In various embodiments, the extension section is preferably made by cold form expansion.

In various embodiments, the tube body inside diameter is preferably consistent.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a side view of a preferred embodiment of the present invention;

FIG. 2 is a close-up view of the connection shown in the dashed box of FIG. 1;

FIG. 3 is a side view of a preferred embodiment of the present invention in a spaced apart configuration;

FIG. 4 is a close-up view of the spaced apart connection shown in the dashed box of FIG. 3;

FIG. 5 is a side view of another preferred embodiment of the present invention;

FIG. 6 is a close-up view of the connection shown in FIG. 5;

FIG. 7 is a side view of another preferred embodiment of the present invention in a spaced apart configuration;

FIG. 8 is a close-up view of the spaced apart connection shown in FIG. 7;

FIG. 18 is a side view of the forged tube of the prior art.

DETAILED DESCRIPTION OF THE INVENTION

Figure 9:
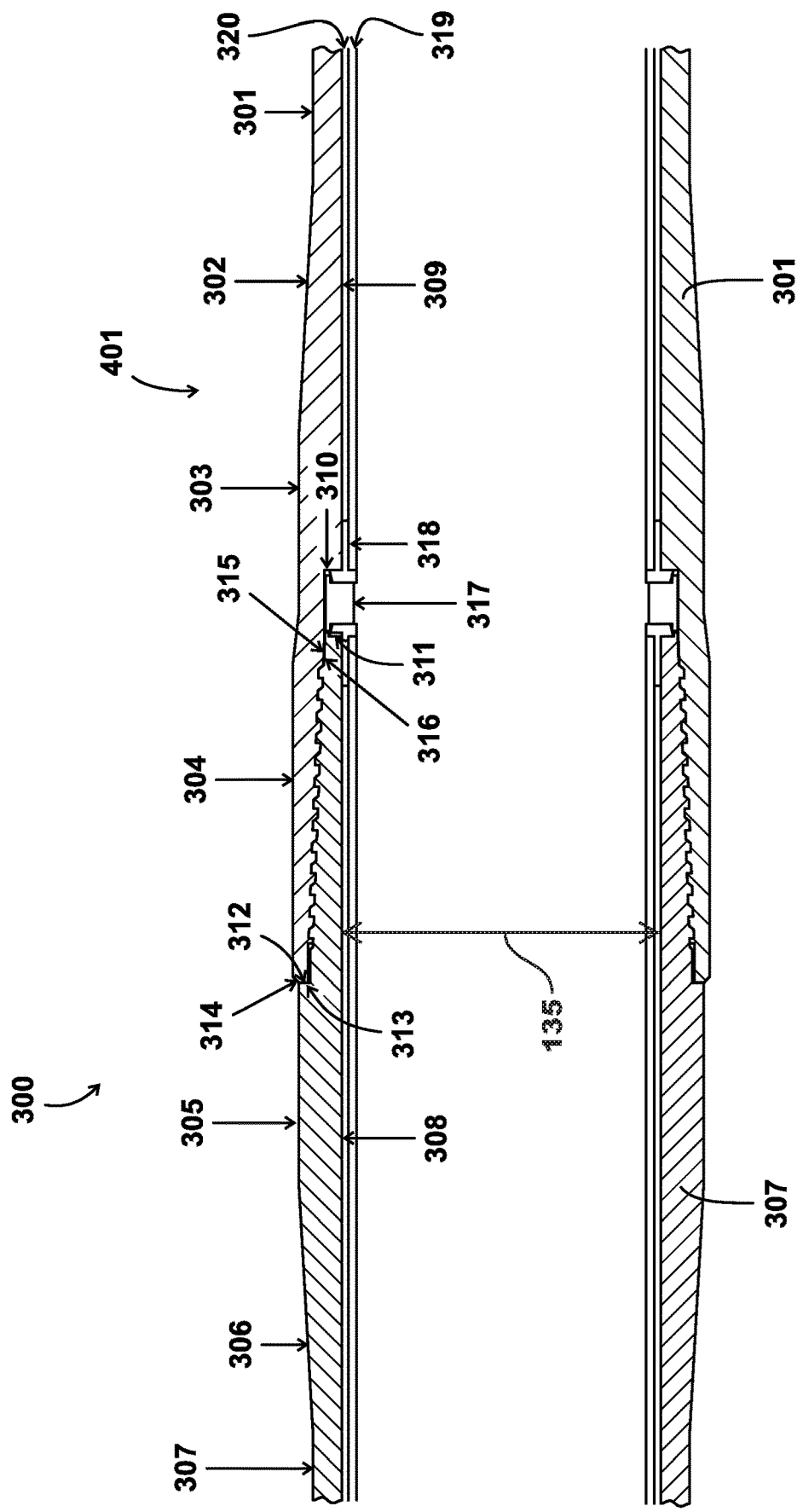
FIG. 9 is a side view of another preferred embodiment of the present invention.

The present invention as shown in FIGS. 1-4, is a tubular apparatus having an integral expanded external upset connection 100, utilizing a standard API hot forged upset. Utilizing standard API upset material preferably allows for lower cost of tubular material, compared to larger two step upset material. A novel expansion of an industry standard forged upset 104 is made by expanding a portion of the existing upset/female end/female connection 103, preferably through cold forming (i.e., expanded), which preferably allows the connection to be diametrically increased such that the critical cross section of the upset/female end/female connection 103 can be maintained equal to pipe 401, plus allowing for a larger internal shoulder/female connection shoulder 110, as seen in FIGS. 1-4. Maintaining the critical cross section equal to pipe 401 preferably provides for tensile capacity equal to the pipe body. The larger internal shoulder/female connection shoulder 110 of the present invention preferably provides for increased torque and compression capacity. The internally flush internal diameter provides smooth flow thru the integral expanded upset connection 100.

Figure 11:
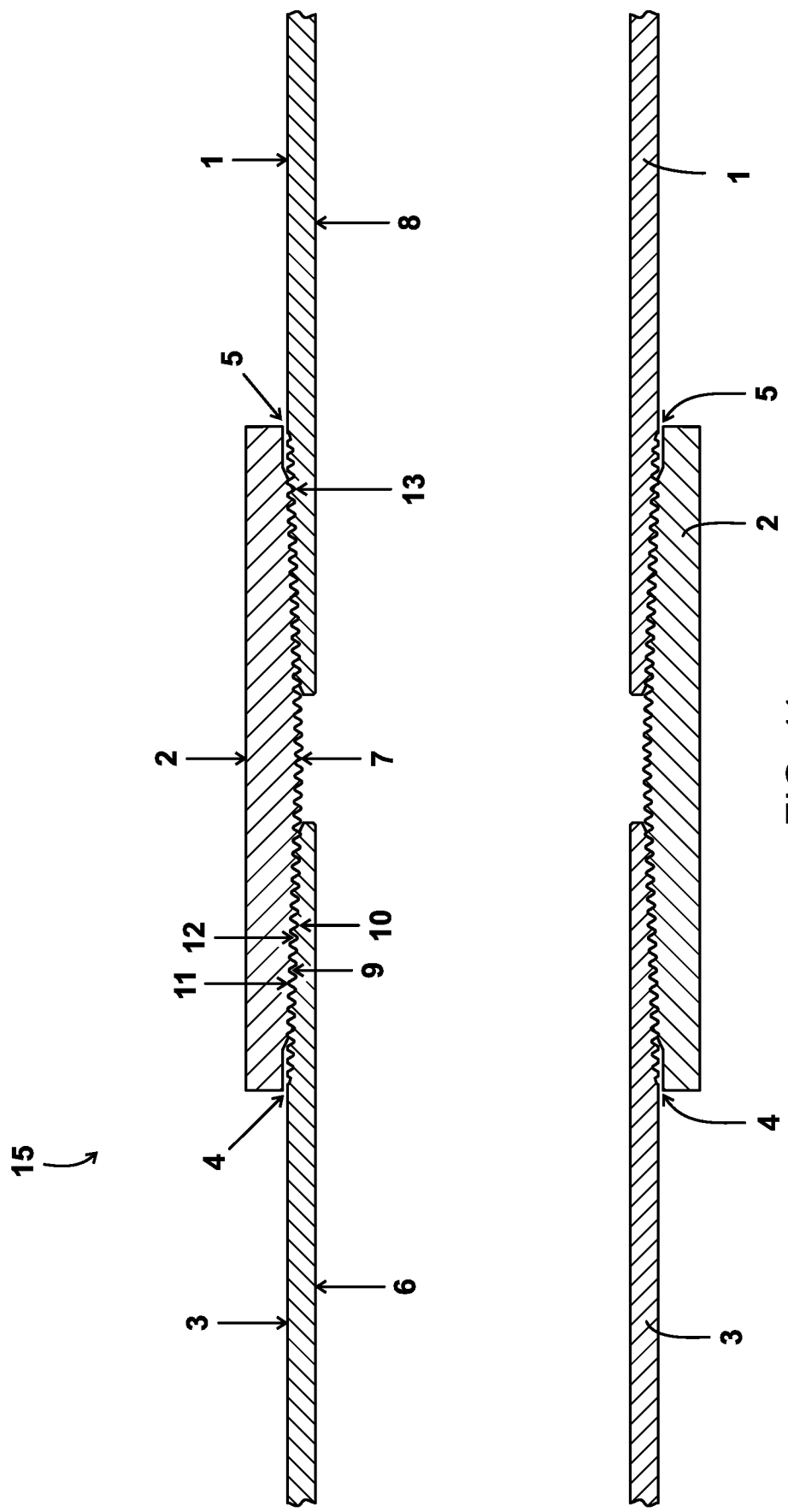
FIG. 11 is a side view of an API Non Upset connection of the prior art.
Figure 12:
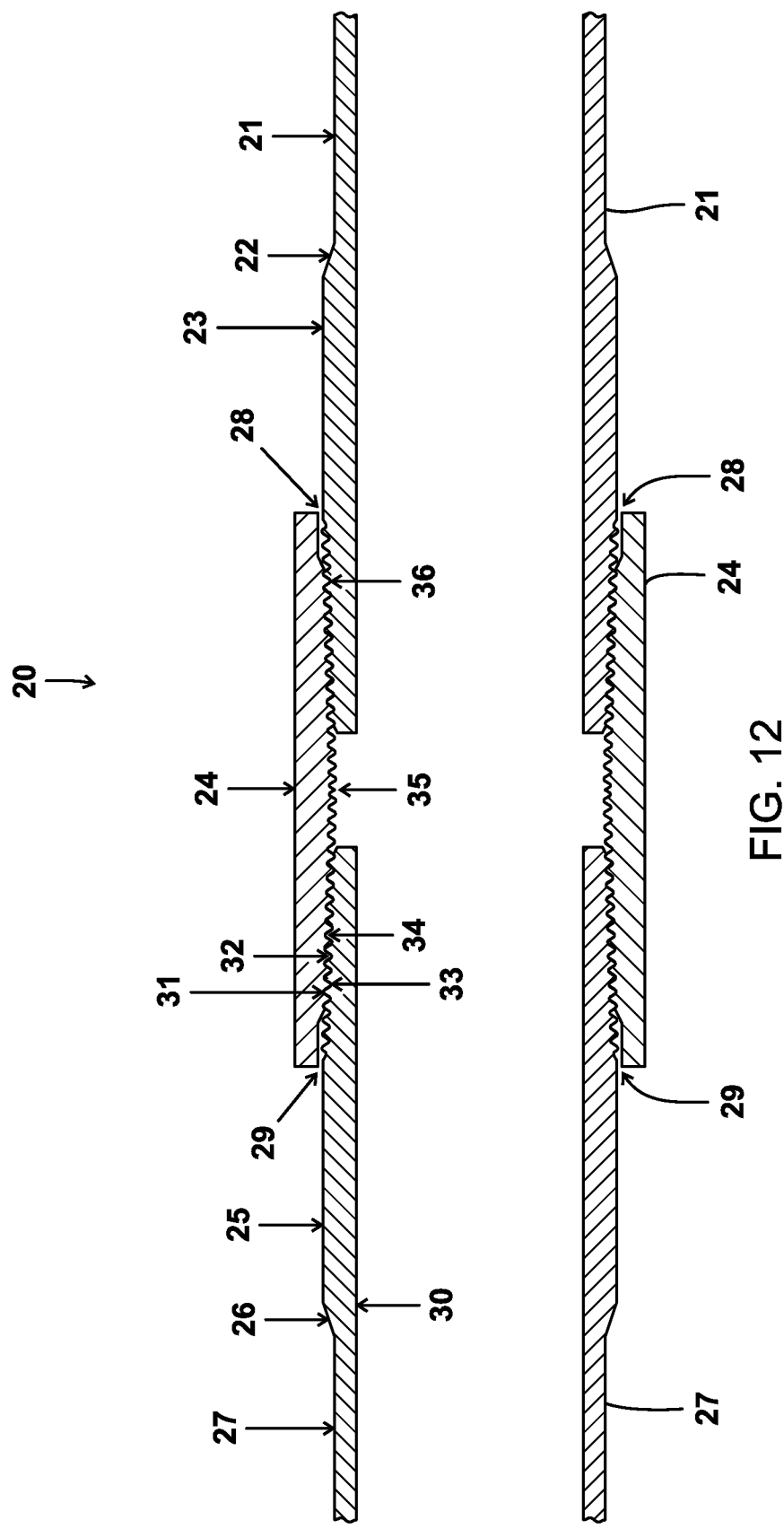
FIG. 12 is a side view of an API External Upset connection of the prior art.
Figure 13:
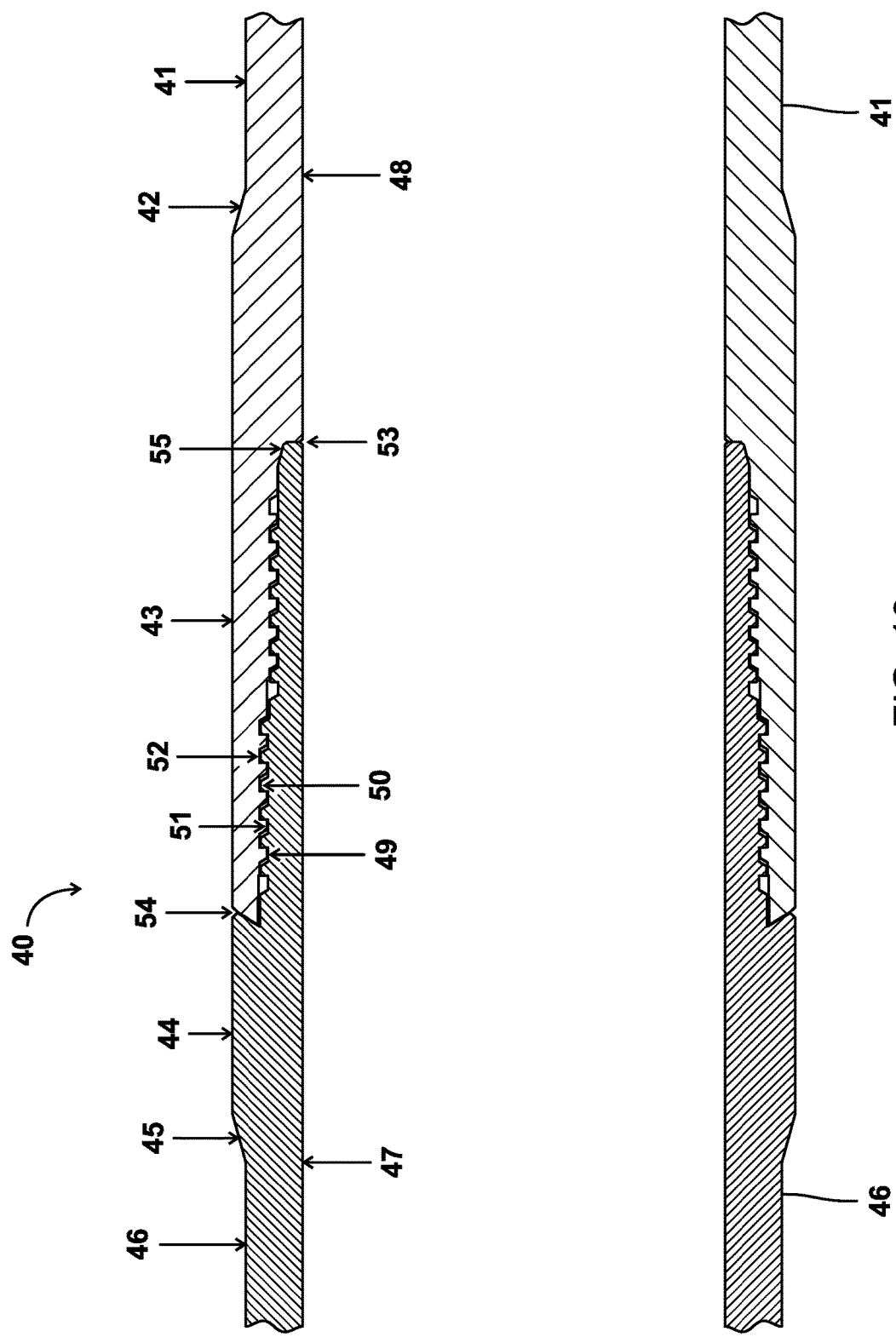
FIG. 13 is a side view of a Near Flush Joint connection of the prior art.
Figure 14:
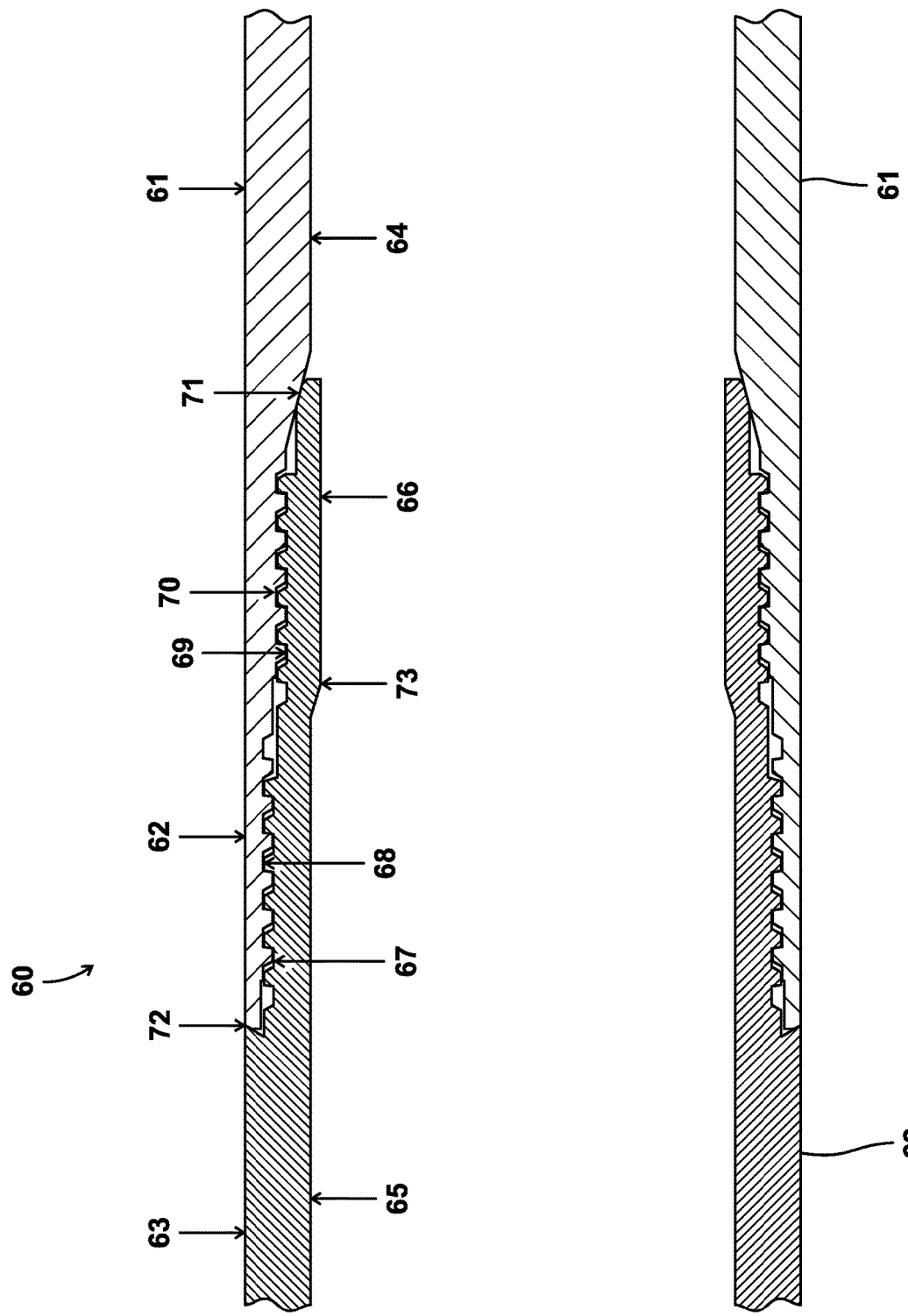
FIG. 14 is a side view of a Flush Joint connection of the prior art.
Figure 15:
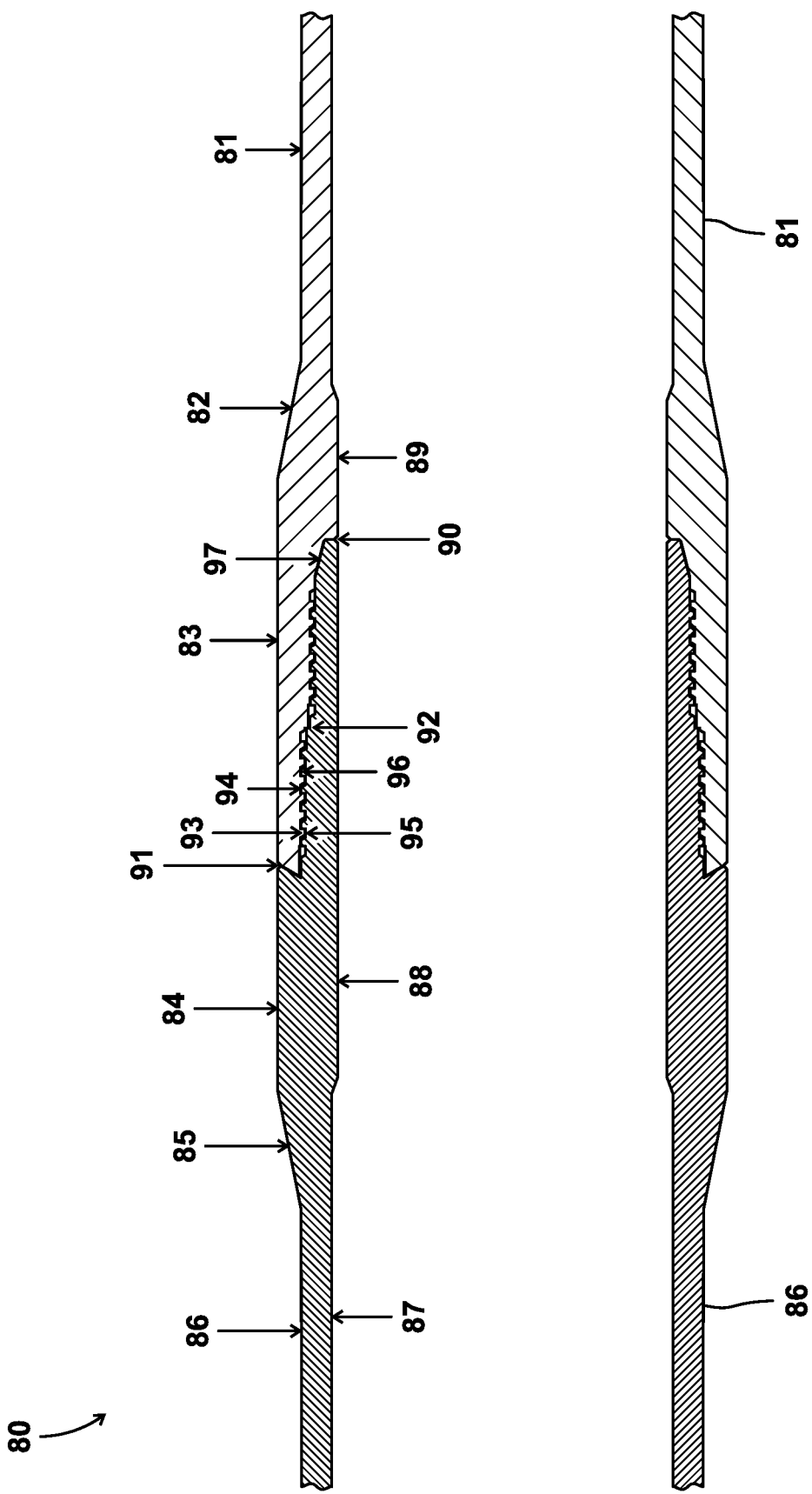
FIG. 15 is a side view of a Two Step connection of the prior art.

Referring to FIGS. 1-8, expanding the one upset/female end 103, 203 preferably allows machining a box/female connection 218 on that end (see FIGS. 1, 6, 8). In the prior art API Non-Upset connection 15 shown in FIG. 11, a coupling 2 is required to join two joints of this pipe/tubing 1, 3 together. Connection 15 has two potential leak paths 4, 5, as shown in FIG. 11. In the prior art API external upset connection 20 shown in FIG. 12, a coupling 24 is used to join together two joints/tubings of pipe 21, 27. Connection 20 has two potential leak paths 28, 29, as shown in FIG. 12. In the embodiment of integral expanded upset connection 100, the box 218 is preferably machined directly onto the expansion section 104, 204 of upset/female end 103, 203 which eliminates the coupling. This is superior to the prior art because prior art couplings inherently have two potential leak paths, e.g., leak paths 4, 5 or 28, 29 as shown in FIGS. 11-12. By eliminating the coupling, the present invention removes at least one of those leak paths 4, 5, 28, 29.

Additionally, standard couplings do not have torque shoulders (see for example FIGS. 11-12). Additional torque preferably allows the pipe to continually advance into the coupling, resulting in galled threads or split couplings. The new connection of integral expanded upset connection 100 preferably allows for internal/female connection torque shoulders 110, 111 and external/male torque shoulders 112, 113, thereby increasing the torque capacity of the connection 100.

In integral expanded upset connection 100, tube body 401 has an outside diameter (O.D.) and an internal diameter (I.D.). The maximum connection outside diameter (O.D.) is preferably less than the typical coupling outside diameter and has better performance. The outside diameter (O.D.) of the present invention can be preferably between about 2⅜" to 4½". More preferably, the outside diameter can be about 2⅜", 2⅞", 3½", 4" or 4½". Most preferably, the outside diameter can be about 2⅜", 2⅞", 3½" or 4½". The smaller diameter preferably provides more clearance for tight hole or horizontal applications.

Preferably, a tube body 401 with an outside diameter of about 2⅜" has an internal diameter of about 1.703"-2.041", more preferably about 1.703", 1.785", 1.867", 1.995" or 2.041", and most preferably about 1.995".

Preferably, a tube body 401 with an outside diameter of about 2⅞" has an internal diameter of about 1.995"-2.441", more preferably about 1.995", 2.091", 2.195", 2.259", 2.323" or 2.441", and most preferably about 2.441".

Preferably, a tube body 401 with an outside diameter of about 3½" has an internal diameter of about 2.440"-3.068", more preferably about 2.440", 2.548", 2.640", 2.750", 2.922", 2.992" or 3.068", and most preferably about 2.750" or 2.992".

Preferably, a tube body 401 with an outside diameter of about 4" has an internal diameter of about 2.780"-3.548", more preferably about 2.780", 3.000", 3.170", 3.340", 3.476" or 3.548", and most preferably about 3.476".

Preferably, a tube body 401 with an outside diameter of about 4½" has an internal diameter of about 3.240"-3.958", more preferably about 3.240", 3.380", 3.500", 3.640", 3.740", 3.826" or 3.958", and most preferably about 3.826" or 3.958".

This novel integral expanded upset connection 100 of the present invention has better performance characteristics than API coupled connections 15, 20, flush joint 60 and near flush 40 connections in the market. These prior art connections can be seen in FIGS. 11-14.

Figure 16:
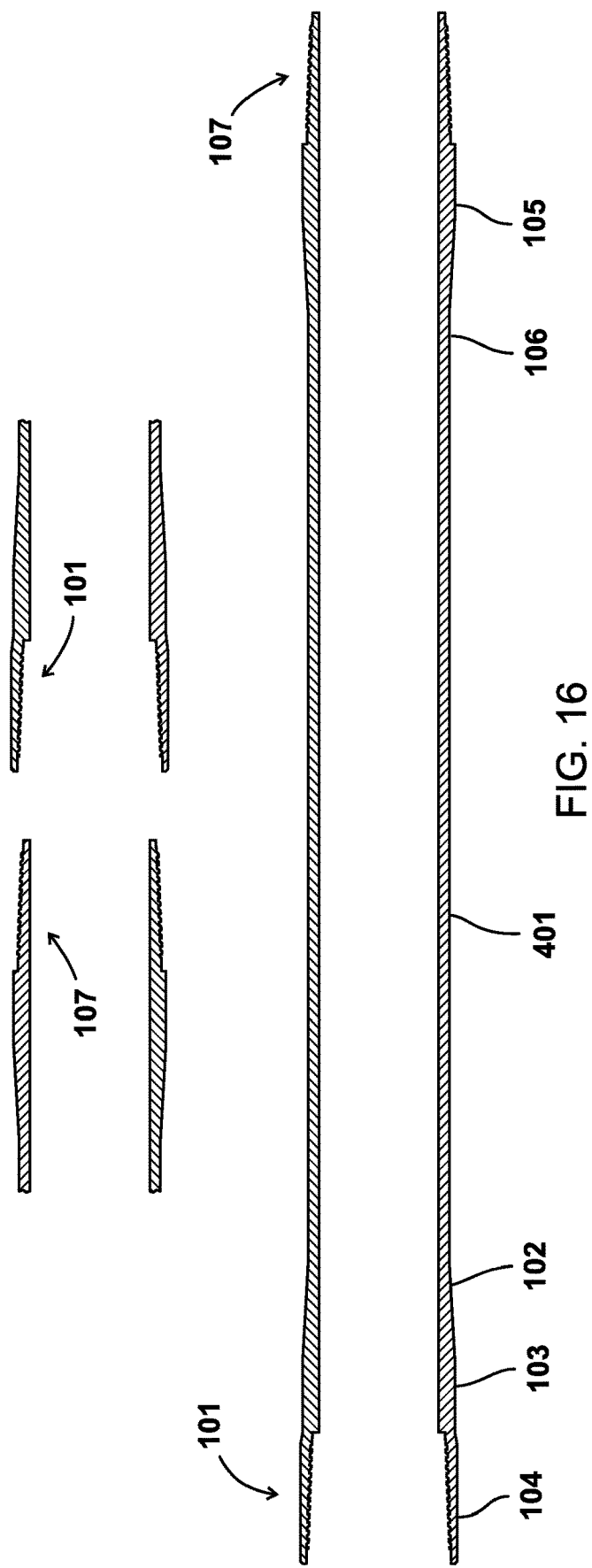
FIG. 16 is a side view of a preferred embodiment of an expanded upset of the present invention showing the male and female end and on the tube.

FIGS. 1-4 show an integral expanded upset connection 100 of the present invention. As seen in FIG. 1, a first pipe section or tubular section or pipe joint 14 is joined to a second pipe section or tubular section or pipe joint 16 at integral expanded upset connection 100. The pipe sections or tubular sections or pipe joints 14, 16 can be drilled pipe sections, casing sections, pipe joints, pup joints, or crossover subs as examples The pipe sections or tubular sections or pipe joints 14, 16 can also preferably be used for various mandrels, sliding sleeves, and any number of other downhole completion accessories. Each section of pipe/length of tubing/tube body 401 has a box end (female thread) 101 and pin end (male thread) 107 on opposite ends of the tube 401 as seen in FIGS. 1, 16. FIGS. 1-4 show the mating ends of two lengths of pipe 14, 16 connecting together showing the box end 101 of one pipe 16 and the pin end 107 of another pipe 14. Each pipe/tube body 401 has an outside diameter (O.D.) at its box end 101, and an O.D. at its pin end 107.

Figure 17:
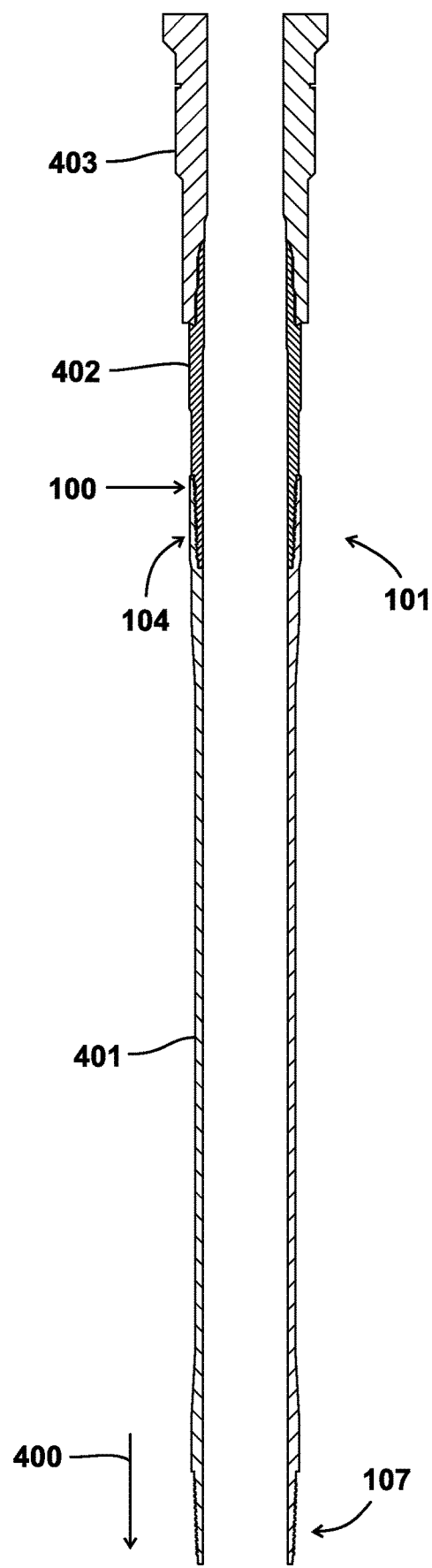
FIG. 17 is a side view of a preferred embodiment of an integral expanded upset of the present invention as in use.

FIG. 17 shows integral expanded upset connection 100 of the present invention as in use in the oilfield. Tubing hanger 403 is preferably connected to one end of double pin sub 402. The other end of double pin sub 402 is preferably connected to box end 101 of integral expanded upset connection 100, as seen in FIG. 17. FIG. 17 shows a first length of tubing 401 having a box end 101 and pin end 107. Multiple lengths of pipe sections or tubular sections 401, each preferably has a box end 101 and pin end 107, and preferably connected via external upset integral connections 100. The connected multiple pipe/tubular sections 401 can lead downhole to a desired depth, as indicated by arrow 400.

FIGS. 1, 3 show an upset transition area 102 of the front end/female thread/box end 101 and the upset transition area 106 of the back end/male thread/pin end 107. The integral expanded upset connection 100 has a female end/forged upset 103 and male end/forged upset 105. The male end/forged upset 105 and female end/forged upset 103 of the integral expanded upset connection 100 are preferably similar to the API industry standard upset. However, the present invention makes use of a novel expansion of female end/forged upset 103 on box end 101. The expansion is made preferably via cold forming and occurs on female end/forged upset section 103 on an existing hot forged upset tubing 404 (shown in FIG. 18) and expansion section 104 is the expanded result (see FIGS. 16-17). FIG. 18 shows hot forged upset tubing 404 having neither male nor female threads and prior to swadging and threading. Tubing 404 can be about 30'-34' long, and preferably can be longer. As shown in FIG. 1, female end/forged upset section 103 has bore 19 and male end/forged upset 105 has bore 18, with pipe/tube body 401 having a general bore 17.

The cold forming process preferably entails using a sized mandrel to expand the female end/forged upset section 103 to a specific diameter. The mandrel is specifically sized for the upset to be expanded, in diameter, length, and taper to produce the finished expanded upset 104 required. A mandrel is preferably attached to a swaging machine's hydraulic ram, and the pipe is preferably held rigid in the same machine via hydraulic clamping system. When in position, the pipe/upset and mandrel are in alignment. Under hydraulic pressure, the mandrel is preferably forced into the upset until the increasing taper of the mandrel expands the upset to the required diameter.

Tube body 401 preferably has an internal diameter (I.D.) 133 having a male end inside surface or bore 108 and a female end inside surface or bore 109. Internal diameter (I.D.) 133 is preferably consistent through tube body 401. The female connection tubular section/pipe section 16 at female end inside surface 109 preferably has a shoulder 110 that corresponds with the male connection tube body 14 inside surface/bore 108 shoulder 111 as seen in FIGS. 1, 3. The female connection 101 preferably has an external shoulder 112 that preferably corresponds with the male connection 107 external shoulder 113. Preferably, the tubular section/pipe section 16 at female end inside surface 109 also has an external bevel 114.

FIGS. 2, 4 show close-up views of the tubular apparatus of the present invention shown in FIGS. 1, 3 respectively, having a female thread stab flank 115, a male thread stab flank 116, a female thread load flank 117, a male thread load flank 118, a male thread crest 119, female thread crest 121, male thread root 122, and female thread root 120. The female thread crest 121/female thread stab flank 115 and male thread crest 119/male thread stab flank 116 each preferably have a radius 123, 126. The female thread root 120/female thread stab flank 115, and male thread root 122/male thread stab flank 116 each preferably have a radius 125, 124. The female thread root 120/female thread load flank 117 and male thread root 122/male thread load flank 118 each preferably have a radius 127, 130. The female thread crest 121/female thread load flank 117 and male thread crest 119/male thread load flank 118 each preferably have a radius 129, 128. Preferably, the female thread stab flank 115 and male thread stab flank 116 is at an angle 131 and the female thread load flank 117 and male thread load flank 118 is at an angle 132.

In a preferred embodiment, the tubular apparatus/thread form of the present invention has a male thread root stab flank radius 124 of preferably about 0.004" to 0.006", more preferably about 0.0045" to 0.0055", and most preferably about 0.0050" and a female thread root stab flank radius 125 of preferably about 0.004" to 0.006", more preferably about 0.0045" to 0.0055", and most preferably about 0.0050". Preferably, the male thread crest stab flank radius 126 is preferably about 0.024" to 0.026", more preferably about 0.0245" to 0.0255", and most preferably about 0.0250" and the female thread crest stab flank radius 123 is preferably about 0.024" to 0.026", more preferably about 0.0245" to 0.0255", and most preferably about 0.0250". Preferably, the male thread root load flank radius 130 is preferably about 0.004" to 0.006", more preferably about 0.0045" to 0.0055", and most preferably about 0.0050" and the female thread root load flank radius 127 is preferably about 0.004" to 0.006", more preferably about 0.0045" to 0.0055", and most preferably about 0.0050". Preferably, the male thread crest load flank radius 128 is preferably about 0.005" to 0.007", more preferably about 0.0055" to 0.0065", and most preferably about 0.0060" and the female thread crest load flank radius 129 is preferably about 0.005" to 0.007", more preferably about 0.0055" to 0.0065", and most preferably about 0.0060". Preferably, the stab flank angle 131 is preferably about 26.691° to 28.691°, more preferably about 27.6905° to 27.6915°, and most preferably about 27.691° and the load flank angle 132 is preferably about 5.309° to 7.309°, more preferably about 6.304° to 6.314°, and most preferably about 6.309°.

Another preferred embodiment of the present invention is an integral expanded upset connection 200 with a seal 405 as shown in FIGS. 5-8. Seal 405 is a feature of an integral expanded upset connection 200 which is designed to preferably restrict the gas or liquid from moving from the inside of the tubing bore 417 thru the connection interface 200 to outside the pipe/tube body 401. This is accomplished by sizing the male seal 216 (See FIG. 8) to be preferably larger in diameter than the female seal 215 (see FIG. 8) at the same linear location when in full make-up position. In doing so, at full make-up position, there exists a significant compressive force between the male mating seal contact surface 216 and female mating seal contact surface 215, which preferably exceeds the force from the pressure in the pipe/tube body 401, thereby preferably restricting the movement of gas or liquid thru the connection male and female seal interface 405.

This embodiment 200 preferably uses a same or similar integral expanded upset connection 100 of the first embodiment, with a pin nose seal 215 (female connection seal) and pin nose seal 216 (male connection seal), which preferably allows for gas tight application. In this embodiment, tube body/pipe 401 preferably has a front/box end 201 and a back/pin end 207, each end having an outside diameter (O.D.).

Integral expanded upset connection 200 preferably has a transition area 202 at the front/box end 201 and a transition area 206 at the back/pin end 207. This embodiment of integral expanded upset connection 200 also preferably uses industry standard upset female and male ends 203, 205. They have no threads and are neither male nor female in the prior art as depicted in FIG. 18. However, the present invention improves on the industry standard by expanding the previously hot forged upset 203 on tubing 404 through cold forming, resulting in expansion section 204. This is a major improvement over the prior art resulting in better performance characteristics.

Tube body/pipe 401 also preferably has an interior diameter (I.D.) 134 at the male end internal diameter/inside surface/bore 208 and female end internal diameter/inside surface/bore 209. Internal diameter (I.D.) 134 is preferably consistent through tube body 401. Preferably, the female end internal diameter/inner surface/bore 209 has a female connection shoulder/internal shoulder 210. Preferably the male end internal diameter/inside surface/bore 208 has a male connection shoulder/internal shoulder 211. Preferably, the male connection/back/pin end 207 has male connection external shoulder 213 and the female connection/front/box end 201 has female connection external shoulder 212, and the female connection/front/box end 201 preferably also has a bevel 214. This embodiment preferably includes a seal 405, wherein the seal 405 is preferably on both the male connection pin nose seal 216 and female connection pin nose seal 215. FIGS. 6, 8 show a close up of the seal 405 of the present invention having a pin 217 of the male connection showing the male connection pin nose seal 216, and a box 218 of the female connection showing the female connection pin nose seal 215.

Figure 10:
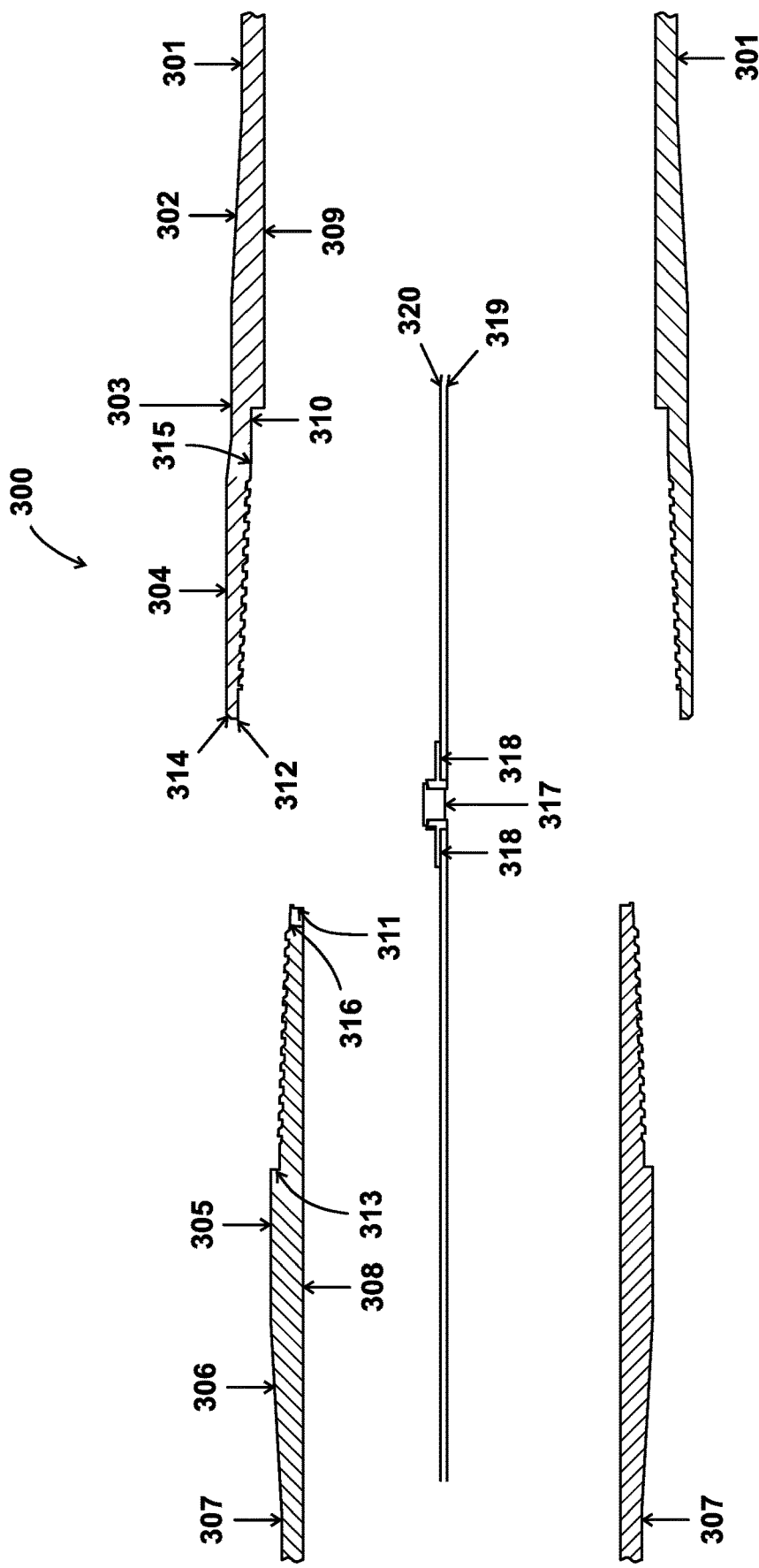
FIG. 10 is a side view of a preferred embodiment of the present invention of FIG. 9 in a spaced apart configuration.

Another embodiment of an integral expanded upset connection 300 of the present invention preferably includes integral expanded upset connection 100 of the previous embodiment, a female connection seal 315, male connection seal 316, FGL (fiberglass) ring 317, female connection FGL ring groove 310, FGL flanges 318, and FGL (fiberglass liner) 319 as shown in FIGS. 9-10, which is preferably for fiberglass liner application. The FGL embodiment 300 is an application specific system which provides an internal fiberglass lining 319 in the tube body 401, preferably to control corrosion.

In this embodiment, tube body/pipe 401 has a front/box end/outside diameter 301 and a back/pin end/outside diameter 307. Integral expanded upset connection 300 preferably has a transition area 302 at the front/box end 301 and a transition area 306 at the back/pin end 307. This embodiment also preferably uses industry standard upset female end 303 and industry standard upset male end 305. However, the present invention expands on the industry standard with an expanded upset 304 as shown in FIGS. 9-10. The novel expanded section 304 is an improved cold form expansion, which is applied to the standard forged upset female end 303 (rather than the industry standard hot formed connection).

Tube body/pipe 401 of integral expanded upset connection 300 also preferably has an internal diameter (I.D.) 135 at male end interior diameter (I.D.)/inside surface/bore 308 and female end interior diameter/inside surface/bore 309. Internal diameter (I.D.) 135 is preferably consistent through tube body 401. Preferably, the female end interior diameter/inside surface/bore 309 has an FGL ring groove 310. Preferably the male end interior diameter (I.D.)/inside surface/bore 308 has a shoulder 311. Preferably, the male connection back/pin end 307 has external shoulder 313 and female connection front/box end 301 has external shoulder 312, and the female connection front/box end 301 preferably also has a bevel 314.

This embodiment 300 preferably includes a seal similar to seal 405 of prior embodiment 200, preferably including seal 316 on the male (pin nose) connection 307 and seal 315 on the female (box) connection 301. Additionally, this embodiment preferably includes an FGL ring 317 that corresponds with the FGL ring groove 310. Preferably ring groove 310 is machined in the female connection 301 and FGL ring 317 sits within the ring groove 310, as seen in FIG. 9. FGL ring 317 preferably sits within ring groove 310 on female connection front/box end 301 and internal shoulder 311 on male connection back/pin end 307. More preferably, FGL flanges 318 are included. Most preferably, mortar 320 is used in integral expanded upset connection 300 as shown in FIGS. 9-10. The mortar is preferably a thin liquid mixture of cement The liner tube in this embodiment 300 is held in place by the mortar 320, which is preferably pumped into the space between the liner 319 and the tube body 401. The flanges 318 are preferably not connected to the integral expanded upset connection 300, but are preferably placed as end caps, for example, at each end of the fiberglass tube. The flanges 318 preferably protect the ends of the fiberglass liner tube 319 and mortar 320. Preferably, FGL ring 317 is placed at the back of the female connection 301, preferably within ring groove 310, and preferably against flange 318. When the mating male connection 307 is made-up, the flange 318 on the male end 307 preferably contacts the FGL ring 317 and applies a compressive force to the FGL ring 317 and the other flange 318, effectively sealing the FGL liner system from production flow.

PARTS LIST

Parts Number Description
1 Tube body/joint of pipe/O.D.
2 Coupling O.D.
3 Tube body/joint of pipe/O.D.
4 Potential Leak Path
5 Potential Leak Path
6 Tube Body I.D.
7 "J" Area
8 Tube Body I.D.
9 Male Thread Crest
10 Male Thread Root
11 Female Thread Root
12 Female Thread Crest
13 Critical Cross Section Tube
14 tubular section/pipe section/pipe joint
15 API non-upset connection (prior art)
16 tubular section/pipe section/pipe joint
17 bore
18 bore section
19 bore section
20 API external upset connection (prior art)
21 Tube body/joint of pipe/O.D.
22 Upset Transition Area
23 Upset O.D.
24 Coupling O.D.
25 Upset O.D.
26 Upset Transition Area
27 Tube body/joint of pipe/O.D.
28 Potential Leak path 29 Potential Leak Path
30 tube I.D.
31 Female Thread Root
32 Female Thread Crest
33 Male Thread Root
34 Male Thread Crest
35 "J" Area
36 Critical Section Area
40 near flush joint connection (prior art)
41 Tube Body O.D.
42 upset transition area
43 upset O.D.
44 upset O.D.
45 upset Transition Area
46 tube body O.D.
47 tube body I.D.
48 tube body I.D
49 male thread root
50 Male Thread Crest
51 Female Thread Crest
52 Female Thread Root
53 Internal Shoulder
54 External Shoulder/Seal
55 Internal Seal
60 flush joint connection (prior art)
61 Tube Body O.D.
62 Female Thread O.D.
63 Tube Body O.D.
64 tube Body I.D.
65 Tube Body I.D.
66 Male Thread I.D.
67 Male Thread Root
68 Male Thread Crest
69 Female Thread Crest
70 Female Thread Root
71 Internal Seal
72 External Shoulder/Seal
73 Internal Swadge
80 two step connection (prior art)
81 tube body O.D.
82 upset transition area
83 female thread upset O.D.
84 male thread upset O.D.
85 upset transition area
86 tube body O.D.
87 tube body I.D.
88 upset I.D.
89 upset I.D.
90 internal shoulder area
91 external shoulder/seal
92 middle shoulder area
93 female thread crest
94 female thread root
95 male thread root
96 male thread crest
97 internal seal
100 integral expanded upset connection
101 front end/female thread/box end or tube body O.D.
102 upset transition area
103 upset/female end/forged upset/female connection
104 novel expansion of forged upset/expansion section
105 industry standard upset—male end/forged upset
106 upset transition
107 back end/male thread/pin end or tube body O.D.
108 male end inside surface/bore
109 female end inside surface/bore
110 female connection shoulder/internal shoulder
111 male connection shoulder/internal shoulder
112 female connection external shoulder
113 male connection external shoulder
114 female connection external bevel
115 female thread stab flank
116 male thread stab flank
117 Female Thread Load Flank
118 Male Thread Load Flank
119 Male Thread Crest
120 Female thread root
121 Female Thread Crest
122 Male Thread Root
123 Female Thread Crest Stab Flank Radius
124 Male Thread Root Stab Flank Radius
125 Female Thread Root Stab Flank Radius
126 Male Thread Crest Stab Flank Radius
127 Female Thread Root Load Flank Radius
128 Male Thread Crest load Flank radius
129 Female Thread Crest load Flank Radius
130 Male Thread Root Load Flank Radius
131 Stab Flank Angle
132 Load Flank Angle
133 internal diameter of tube body
134 internal diameter of tube body
135 internal diameter of tube body
200 integral expanded upset connection of the present invention with seal
201 front/box end or Tube body O.D./female connection
202 Upset transition area
203 Industry Standard Upset—Female End
204 Expansion of an Industry Standard Forged Upset/expansion section
205 Industry Standard Upset—Male End
206 Upset Transition
207 back/pin end or Tube Body O.D./male connection
208 male end inside surface/bore/I.D.
209 female end inside surface/bore/I.D.
210 female connection shoulder/internal shoulder
211 Male Connection Shoulder/internal shoulder
212 Female Connection External Shoulder
213 Male Connection External Shoulder
214 female Connection External Bevel
215 Female Connection Seal/pin nose connection
216 Male Connection Seal/pin nose connection
217 pin/box connection
218 box/female connection
300 integral expanded upset connection of the present invention with seal and FGL
301 front/box end or Tube body O.D./female connection
302 Upset transition area
303 Industry Standard Upset—Female End
304 novel expansion of an Industry Standard Forged Upset/expansion section
305 Industry Standard Upset—Male End
306 Upset Transition area
307 back/pin end or Tube Body O.D./male connection
308 male end inside surface/bore/I.D.
309 female end inside surface/bore/I.D.
310 Female Connection FGL Ring Groove
311 Male Connection I.D. Shoulder
312 Female Connection External Shoulder
313 Male Connection External Shoulder
314 female Connection External Bevel
315 Female Connection Seal
316 Male Connection Seal
317 FGL ring
318 FGL flanges 319 FGL (fiberglass liner)
320 mortar
400 downhole arrow
401 length of tubing/tube body/pipe
402 double pin sub
403 tubing hanger
404 hot forged upset tubing
405 seal
417 bore All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A tubular with threaded connection portions, comprising:
   a) a generally cylindrically shaped tube body having first and second ends, an outside diameter, and an inside diameter;
   b) an extension section on said tube body first end having a female connection with a female threaded portion;
   c) a male connection on said tube body second end that has a male threaded portion and is adapted to mate with a female connection;
   d) the tube body having a first upset and a second upset;
   e) wherein the second upset is an expanded section including internal and external shoulders and an external bevel;
   f) wherein the first upset has a second diameter greater than the tube body outside diameter and the second upset has a third diameter greater than the second diameter;
   g) wherein the female connection female threaded portion has thread stab, thread load, thread crest, and thread root;
   h) wherein the male connection male threaded portion has a thread stab, thread load, thread crest, and thread root;
   i) wherein the male and female thread crests and thread roots each have a stab flank having a radius;
   j) wherein the male and female thread roots each have a root load flank, each having a radius, and the male and female thread crests each have a crest load flank, each having a radius;
   k) wherein the stab flank has a stab flank angle and the load flank has a load flank angle, wherein the stab flank angle is greater than the load flank angle;
   l) wherein a majority of the female threaded portion is positioned at said second upset; and
   m) wherein the internal shoulder is on the first upset.

2. The tubular of claim 1 wherein the tube body outside diameter is between 2⅜ and 4½ inches.

3. The tubular of claim 1 wherein the male thread root stab flank radius is 0.0050", the female thread root stab flank radius is 0.0050", the male thread crest stab flank radius is 0.0250", and the female thread crest stab flank radius is 0.0250".

4. The tubular of claim 1 wherein the male thread root load flank radius is 0.0050", the female thread root load flank radius is 0.0050", the male thread crest load flank radius is 0.0060", and the female thread crest load flank radius is 0.0060".

5. The tubular of claim 1 wherein the stab flank angle is between 26 and 28 degrees.

6. The tubular of claim 1 wherein the load flank angle is between 5 and 7 degrees.

7. The tubular of claim 1, further comprising a seal, wherein the seal is positioned at a connection of said internal shoulders of the first and second ends.

8. The tubular of claim 7 wherein the second end internal shoulder has a diameter larger than a diameter of the first end internal shoulder.

9. The tubular of claim 1, wherein the tube body inside diameter is consistent.

10. The tubular of claim 1 wherein the female threaded portion starts at a transition section in between the first and second upsets.

11. The tubular of claim 1 wherein all of the female threaded portion is positioned at said second upset.

12. A tubular connection, comprising:
   a) a tube body having standard upset connections, front and back ends, an outside diameter, and an inside diameter, wherein the front end includes an extension section having a female connection, and the back end includes a male connection that is adapted to mate with the female connection of the front end;
   b) the tube body having an upset transition area at the front end and an upset transition area at the back end;
   c) wherein the upset connection on said front end is expanded creating said extension section including internal and external shoulders and an external bevel;
   d) wherein said back end includes internal and external shoulders that mate with said front end internal and external shoulders;
   e) wherein the female connection has thread stab, thread load, thread crest, and thread root;
   f) wherein the male connection has a thread stab, thread load, thread crest, and thread root;
   g) wherein the male and female thread crests and thread roots each have a stab flank having a radius;
   h) wherein the male and female thread roots each have a root load flank, each having a radius, and the male and female thread crests each have a crest load flank, each having a radius;
   i) wherein the stab flank and load flank are at a specified angle;
   j) further comprising a seal, wherein the seal is positioned at a connection of said internal shoulders of the front and back ends; and
   k) further comprising a groove on the female connection, and a correspondingly shaped fiberglass ring that occupies the groove.

13. The connection of claim 12 further comprising fiberglass flanges at the male connection and a fiberglass liner.

14. The connection of claim 13 further comprising mortar used at the upset connection.

15. A tubular having a thread form for making tubular connections, comprising:
   a) a tube body having a front end, a back end, an outside diameter, an internal diameter;
   b) a first external upset area, a second external upset area, and an extension section having a female connection including a female threaded portion, said female threaded portion having an internal shoulder, an external shoulder, and an external bevel;
   c) the back end including a male connection having a male threaded portion including an internal shoulder and an external shoulder, wherein said male connection internal and external shoulders correspond with the female connection internal and external shoulders;
   d) the female connection female threaded portion having a thread stab, a thread load, a thread crest, and a thread root;

e) wherein the first upset has a second diameter greater than the tube body outside diameter and the second upset has a third diameter greater than the second diameter;
f) the male connection male threaded portion having a thread stab, a thread load, a thread crest, and a thread root;
g) wherein the male and female thread crests and thread roots each have a stab flank having a radius;
h) wherein the male and female thread roots each have a root load flank, each having a radius, and the male and female thread crests each have a crest load flank, each having a radius;
i) wherein the stab flanks and load flank are positioned at different angles;
j) wherein all of the female threaded portion is positioned at said second upset; and
k) wherein the female internal shoulder is on the first upset.

16. The tubular having a thread form of claim 15 wherein the tube body outside diameter is between 2⅜ and 4½ inches.

17. The tubular having a thread form of claim 15 wherein the male thread root stab flank radius is 0.0050", the female thread root stab flank radius is 0.0050", the male thread crest stab flank radius is 0.0250", and the female thread crest stab flank radius is 0.0250".

18. The tubular having a thread form of claim 15 wherein the male thread root load flank radius is 0.0050", the female thread root load flank radius is 0.0050", the male thread crest load flank radius is 0.0060", and the female thread crest load flank radius is 0.0060".

19. The tubular having a thread form of claim 15 wherein the stab flank angle is between 26 and 28 degrees.

20. The tubular having a thread form of claim 15 wherein the load flank angle is between 5 and 7 degrees.

21. The tubular having a thread form of claim 15 further comprising a seal, wherein the seal is positioned at a connection of said internal shoulders of the male and female connections.

22. The tubular having a thread form of claim 21 wherein the male connection internal shoulder has a diameter larger than a diameter of the female connection internal shoulder.

23. The tubular having a thread form of claim 15, wherein the tube body internal diameter is consistent.

24. The tubular of claim 15 wherein the female threaded portion starts at a transition section in between the first and second upsets.

25. A thread form for making a tubular connection, comprising:
a) a tube body having a front end, a back end, an outside diameter, an internal diameter;
b) the front end including an upset transition area, an A.P.I. industry standard external upset, and an extension section having a female connection including an internal shoulder, an external shoulder, and an external bevel, wherein the extension section is created by expansion of said industry standard external upset;
c) the back end including an upset transition area, an A.P.I. industry standard external upset, and a male connection including an internal shoulder and an external shoulder, wherein said male connection internal and external shoulders correspond with the female connection internal and external shoulders;
d) the female connection having a thread stab, a thread load, a thread crest, and a thread root;
e) the male connection having a thread stab, a thread load, a thread crest, and a thread root;
f) wherein the male and female thread crests and thread roots each have a stab flank having a radius;
g) wherein the male and female thread roots each have a root load flank, each having a radius, and the male and female thread crests each have a crest load flank, each having a radius;
h) wherein the stab flanks and load flank are positioned at a specified angle; and
i) further comprising a groove on the female connection, and a correspondingly shaped fiberglass ring that occupies the groove.

26. The thread form of claim 25 further comprising fiberglass flanges at the male connection and a fiberglass liner.

27. The thread form of claim 26 further comprising mortar used at the connection.

* * * * *